UNITED STATES PATENT OFFICE.

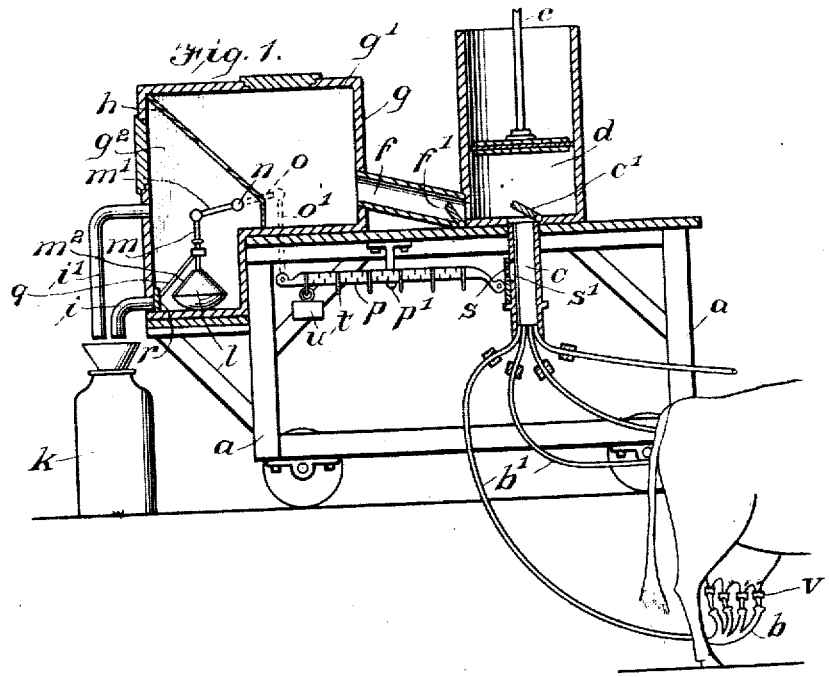
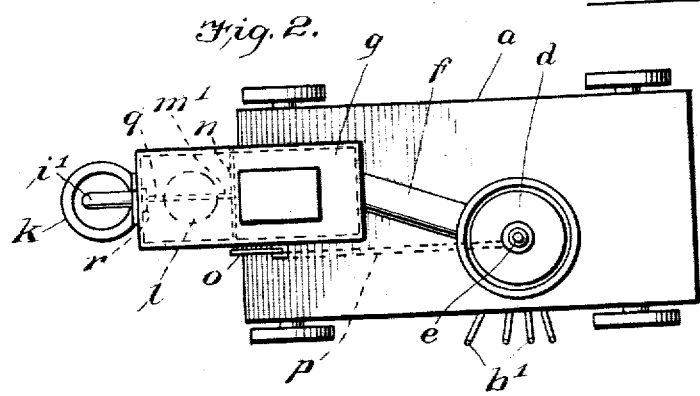
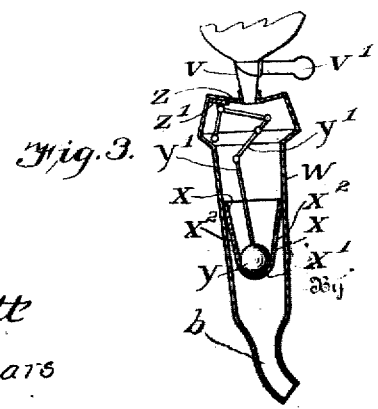

STEFAN BREITE, OF DRESDEN, GERMANY.

MACHINE AND APPARATUS FOR MILKING.

No. 865,476.

Specification of Letters Patent.

Patented Sept. 10, 1907.

Application filed February 23, 1907. Serial No. 359,026.

*To all whom it may concern:*

Be it known that I, STEFAN BREITE, a subject of the German Emperor, dairyman, temporarily residing at No. 60 Friedrichstrasse, Dresden, in the Kingdom of Saxony, Germany, have invented certain new and useful Improvements in Machines or Apparatus for Milking, of which the following is a specification.

The present invention has reference to improvements in mechanical appliances for milking and its special feature consists in the regulation of the suction which the machine exerts on the dugs or teats of the animal being in complete accordance with the natural conditions which prevail at the initial, culminating and finishing stages of the process of milking.

By the use of many of the machines and appliances for milking hitherto known, there is a liability to injure the udder of the animal by irregular and unnatural exertion, in consequence of which inflammation and other undesirable effects may be produced. By the use of this invention the before mentioned and other similar drawbacks of milking with machines are removed.

The contrivance I employ is distinguished by its simplicity and conformity to nature. At the same time it is quite effective, dependable and does not make the machine a complicated one. It consists of the introduction of an air inlet in the suction ducts, the quantity of air allowed to enter being regulated in strict accordance with the flow of milk.

In the accompanying drawing, Figure 1 is a vertical elevation of the new machine in use, Fig. 2 is a view of the machine as seen from above and Fig. 3 is a detail to be hereinafter referred to.

The whole apparatus is mounted on a portable platform $a$. The ducts $b$, one each of which is suitably attached to a dug or teat, meet in the tube $b^1$ which leads to the common raising tube $c$ the said tube $c$ discharging into the inclosed space $d$ through the relief-valve $c^1$; in the said space $d$ there is a suction and force-pump $e$, which may be worked by any convenient and suitable power. Sidewise a duct $f$ provided with a relief valve $f^1$ leads out of the pump space $d$ to the collecting vessel $g$ which the partition $h$ divides into two compartments, the upper compartment $g^1$ and the lower one $g^2$ the said compartments being connected by means of a suitable opening in the said partition $h$. The lower compartment $g^2$ has an outlet pipe $i$ and an overflow pipe $i^1$ both of which conduct to the can $k$. In the said compartment $g^2$ there is a float $l$, which is connected by means of the rod $m$ and lever $m^1$ to the axle $n$, which projects through the wall of the compartment. Outside, on the projecting part of the axle $n$, a movable lever $o$ is mounted and connected with the connecting rod $o^1$ which is jointed on to one end of the scale-beam $p$ hung on a support $p^1$ suitably attached to the frame of the machine.

The rod $m$ is loosely grasped by the arm $q$, which can move between the float $l$ and the stop $m^2$ the said arm $q$ being attached to and actuating the sliding valve $r$ of the pipe $i$. Attached to the before-mentioned scale-beam $p$ is the slide-valve $s$ which controls the opening $s^1$ leading to the raising tube $c$. To the scale-beam $p$ a number of hooks $t$ are fixed at measured distances, the said hooks being intended to hang the weight $u$ on.

Fig. 2 being only a view of the apparatus as seen from above, and as it does not show any parts not described in connection with Figs. 1 and 3, no further reference is necessary.

Fig. 3 represents a contrivance to be employed in connection with the apparatus when milking animals which, by reason of age or from other causes, require special care in regulating the suction action of the pump. To each duct $b$ a spring ring $v$ is attached. The said rings $v$ can be distended by handles $v^1$. A short distance below the said ring $v$ a case with a bag-shaped inset $x$ is inserted in the duct $b$. The said inset $x$ is provided with a sieve $x^1$ at the bottom, and also has openings $x^2$ at the sides to admit air and provide an outlet for the overflowing milk. The bag-shaped inset contains a float $y$ which is connected by means of the lever $y^1$ with the sliding-valve $z^1$ which controls the air inlet $z$.

The machine works as follows: The piston of the pump $e$ being raised, it draws the milk from the teats through the pipe $c$ to the space $d$. When depressed it closes the valve $c^1$ and forces the milk through the duct $f$ to the float compartment or container $g$ from which it runs into $g^1$ automatically. The separation is provided, in the first place, in order that the pressure wave may be broken on the partition $h$, and, in the second place, to avoid as much as possible the contents of compartment $g^2$ being agitated. When the float $l$ rests on the bottom of $g^2$, the upper and perforated part of the sliding-valve $s$ is before the opening $s^1$, and, in consequence of suction, a quantity of air enters $c$ and reduces the sucking action on the teats or dugs to the extent which is necessary at the initial stage of milking. As the milk collects the float rises; at the same time the full flow of milk sets in and the action of the pump can be concentrated on the teats. This is caused by the float rising with the milk and gradually shutting off the inlet of air at $c$. While the milk is rising, the arm $q$ remains stationary until the float rises high enough to press it upward and thereby raise the slide valve $r$. The result of this is, a perforated part of the slide moves in front of the outlet $i$ and allows the milk to run into the receptacle $k$. In this manner the initial stage of the milking process is performed and the culminating stage reached. The float rises as far as it can and remains in that position until the process approaches its end.

The finishing stage is carried out as follows: The flow of milk from the teats diminishes and gradually ceases. Consequently the level of the milk in container $g^2$ falls as the efflux is greater than the influx. The float sinks, the perforated part of the slide valve $s$ moves before the opening $s^1$ admitting air to reduce the sucking action on the teats as at the outset. Directly the bottom of the float is on a level with the lower edge of the slide $r$, the stop $m^1$ catches the arm $q$ the slide $r$ is pressed down, and settles with the float on the bottom of the container. The machine ceases to work, but can commence working again directly the ducts have been attached to the next animal to be milked, the suction power having been sufficiently reduced for the initial stage of milking to be commenced.

It is obvious that like conditions do not obtain with all animals, and that the concentrated action of suction may supervene with some animals much quicker than with others e. g. cows which are in milk for the first time. With the latter the full flow of milk comes very tardily and may at times not come at all. But an efficient dairyman, will know which animals give their milk freely, and can adjust the machine to suit each individual case. For this purpose the scale-beam $p$ with the weight $u$ is provided. The nearer the weight $u$ is moved towards the float $l$ the more easily this will rise; the further off it is, the more slowly it will rise, and of course the inlet of the air at $s^1$ is cut off or sustained in accordance with the time which the float takes to rise. By means of the scale marked on the beam this may be adjusted very finely.

As a matter of course the machine can be built in various shapes without materially altering the principal features. It may be built as a single machine, or all its parts may be duplicated to allow of its being used in a double cowstall with the animals stalled so as to leave a passage between the two rows.

It is essential that some means should be provided for cutting off, when advisable, one or more teats from the general suction action, and to again bring it or them under its influence when necessary. The contrivance for this is shown in Fig. 3. The duct $b$ is fitted on the teat by means of the spring ring $r$, which holds the duct in place by contracting. The float is resting on the bottom, the outlet $z$ is open, not sufficiently wide to cut off the suction altogether but only enough to reduce it. The machine is started; immediately after the first few strokes the milk in the bag $x$ rises and forces up the float $y$, the opening $z$ is closed by the slide $z^1$ and the suction power concentrated on each single teat in exact accordance with its condition for milking. But as the flow of milk develops but gradually, and the quantity of milk varies in each quarter of the udder, intervals may arise in the flow from one or other quarter. In such cases the float $y$ sinks, the slide moves away from the inlet and air is sucked in in place of milk.

If this were not to take place, the continued suction on the teat would injure the cellular tissue of the udder and disease be set up. In consequence of the reduction of the suction, the milk can collect and begins to flow again of its own accord. In this manner the milking process goes on till the milk ceases to flow, which is indicated by the slide $s$ on the raising tube $c$ opening to its extreme limit.

Having now described the nature of my invention and its application, what I claim is:

1. In a milking machine the combination with an air exhauster, and milk ducts leading thereto from the teats of the cow, of automatic means for admitting air to the exhauster when the flow of milk is below the maximum.

2. In a milking machine the combination with an air exhauster, and milk ducts leading thereto from the teats of the cow, of automatic means for admitting air to the exhauster when the flow of milk is below the maximum, and decreasing the inflow of air as the flow of milk increases.

3. In a milking machine the combination with an air exhauster, and milk ducts leading thereto from the teats of the cow, of automatic means for admitting air to the exhauster when the flow of milk is below the maximum, and means for cutting off the inflow of air when the maximum flow of milk is reached.

4. In a milking machine the combination with an air exhauster, and milk ducts leading thereto from the teats of the cow, of automatic means for admitting air to the exhauster when the flow of milk is below the maximum, and increasing the inflow of air as the milk decreases.

5. In a milking machine the combination with an air exhauster, and a milk duct for each teat of a cow communicating with the exhauster, of independent means for admitting air to each duct while the flow of milk therein is below the maximum.

6. In a milking machine the combination with an air exhauster, and a milk duct for each teat of a cow communicating with the exhauster, of independent means for admitting air to each duct while the flow of milk therein is below the maximum, and increasing or decreasing the inflow of air as the flow of milk is varied.

7. In a milking machine, the combination with an air exhauster and milk ducts leading into it from the teats of a cow, of an air inlet valve in said ducts, a milk receptacle, and a float valve in the milk receptacle governing the air inlet valve.

8. In a milking machine, the combination with an air exhauster and milk ducts leading into it from the teats of a cow, of an air inlet valve in said ducts, a milk receptacle, a milk exit valve, and a float valve in the milk receptacle governing the air inlet valve and the milk exit valve.

9. In a milking machine, the combination with an air exhauster and milk ducts leading into it from the teats of a cow, of an air inlet valve in said ducts, a milk receptacle, a scale beam attached to the air inlet valve, and a float valve in the milk receptacle attached to the scale beam and governing the air inlet valve.

In testimony whereof, that I claim the foregoing as my invention, I have signed my name in presence of two subscribing witnesses.

STEFAN BREITE.

Witnesses:
ULYSSES J. BYWATER,
PAUL ARRAS.